Sept. 16, 1969  G. C. DODDS ET AL  3,467,023
ACCUMULATING AND PUSHER TOW TRUCK CONVEYOR SYSTEM
Filed Nov. 10, 1966  8 Sheets-Sheet 1
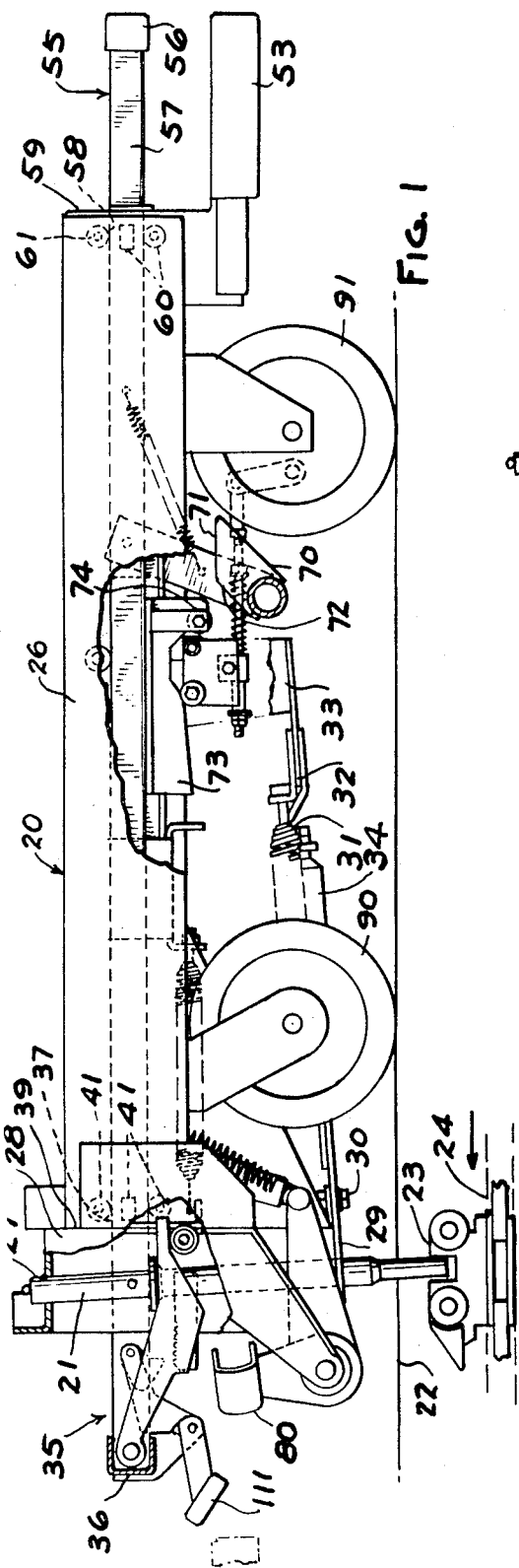
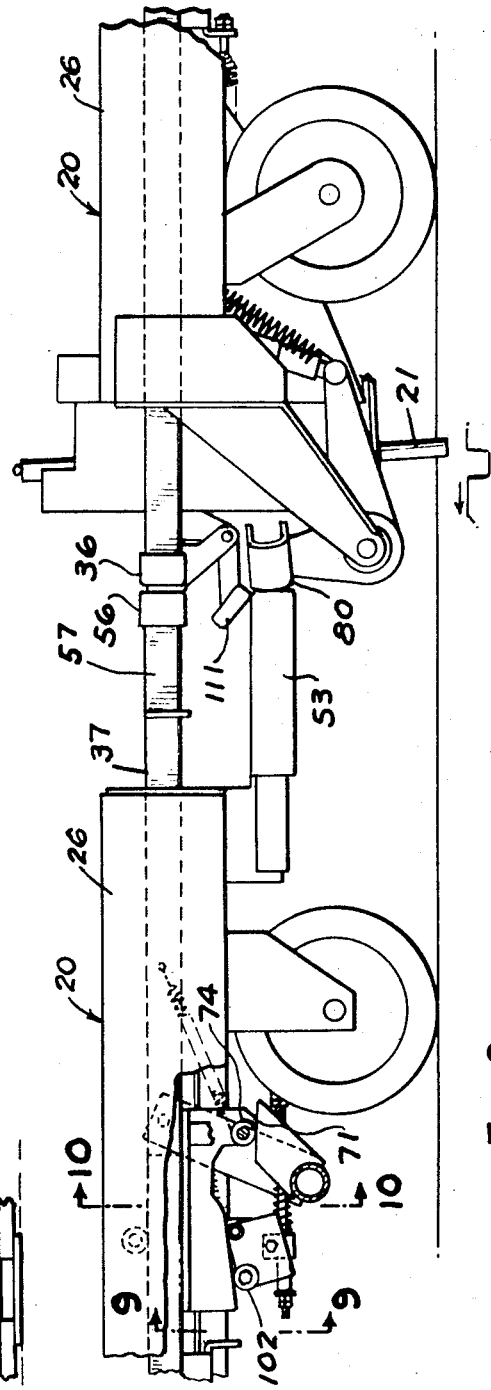
INVENTORS
GERALD C. DODDS
KARL R. M. KARLSTROM
& WERNER W. KORT
BY
Barnes, Kisselle, Raisch & Choate
ATTORNEYS

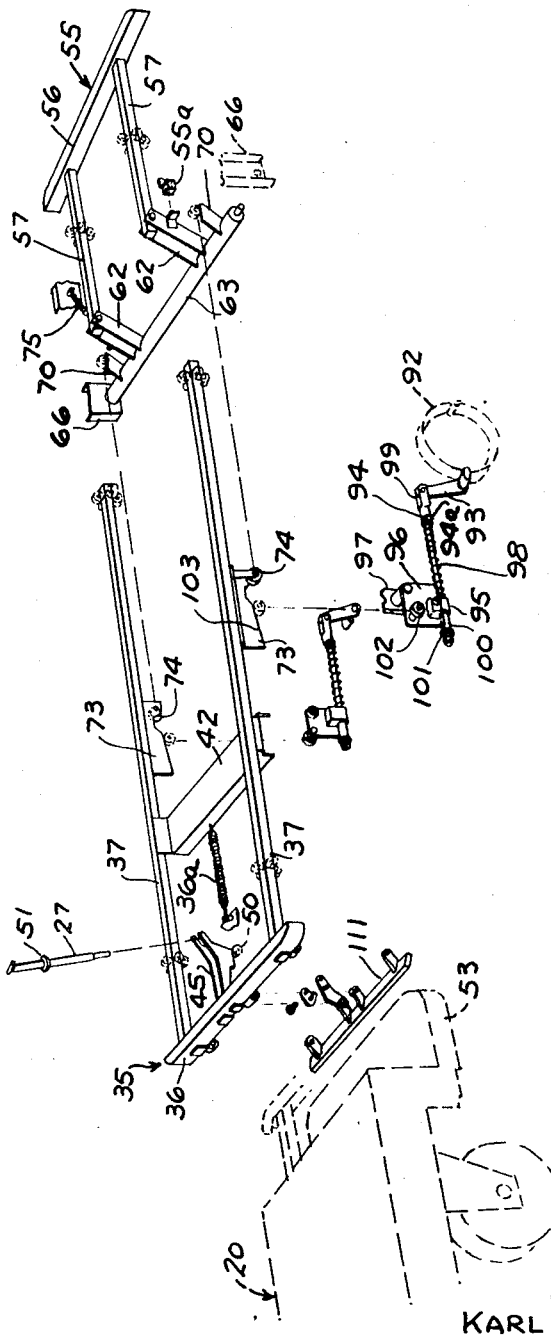

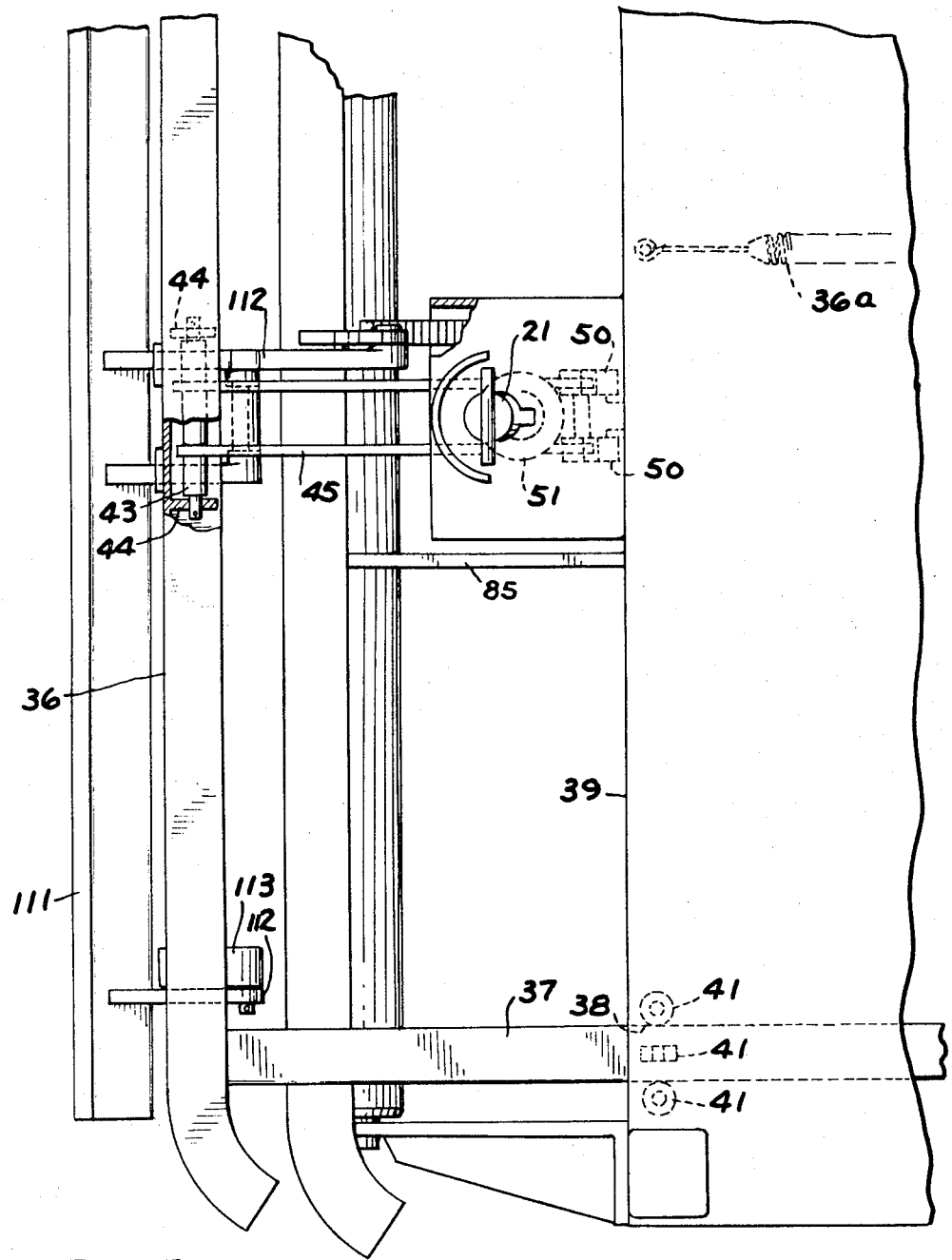

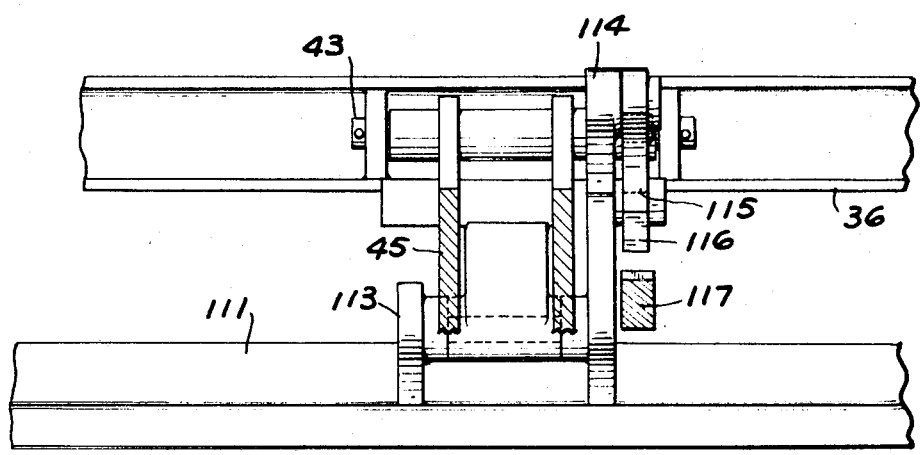
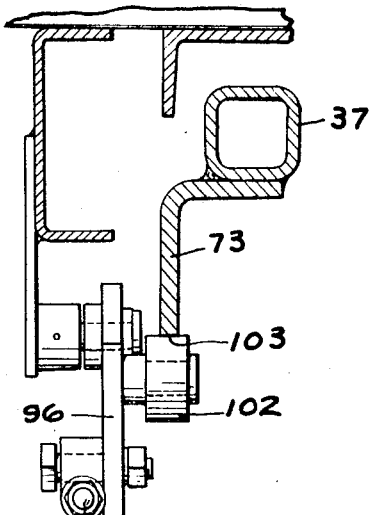
FIG. 8
FIG. 9

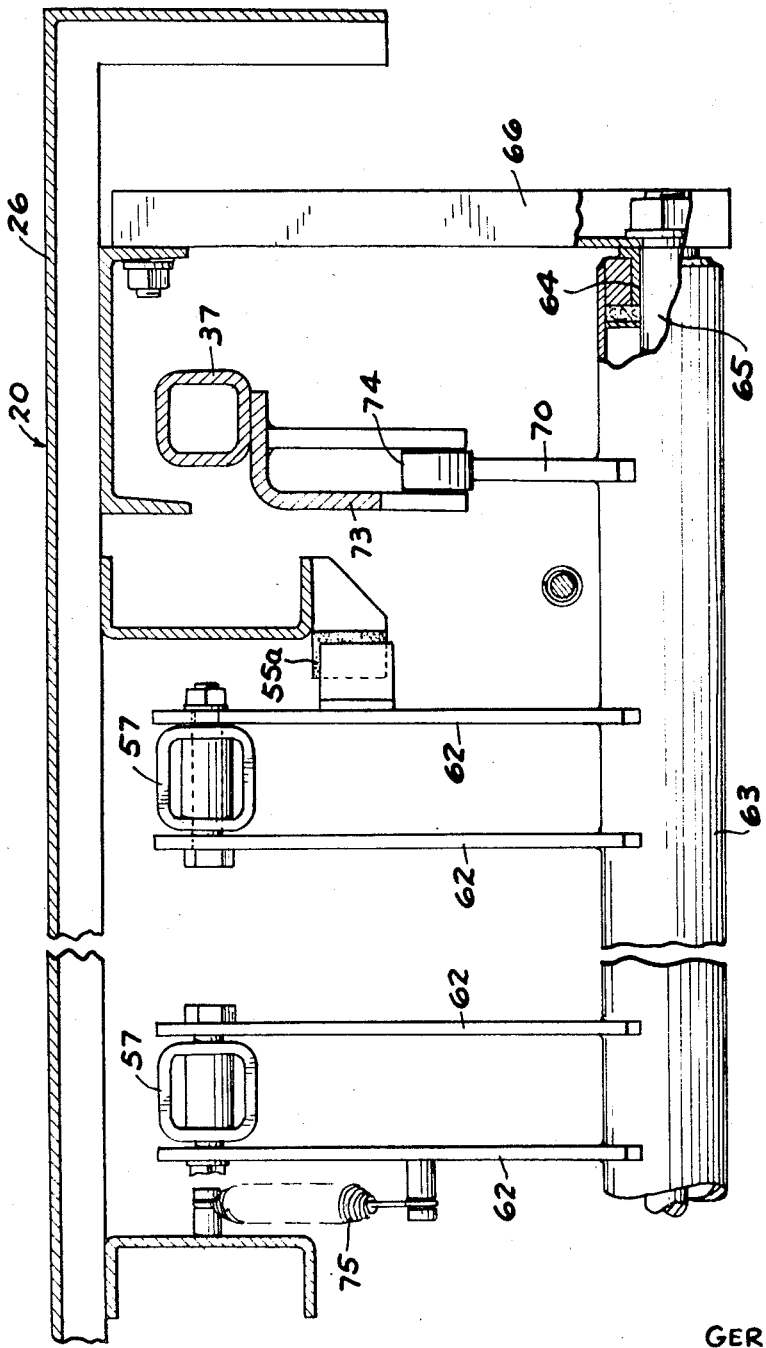

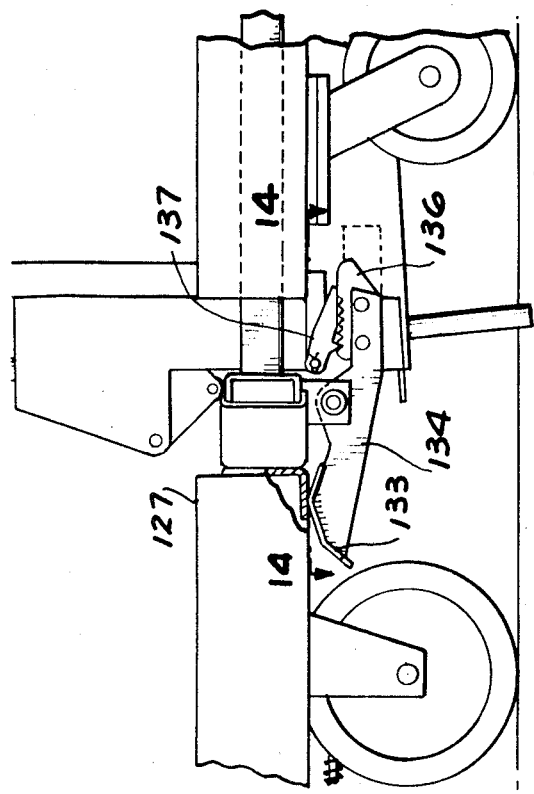
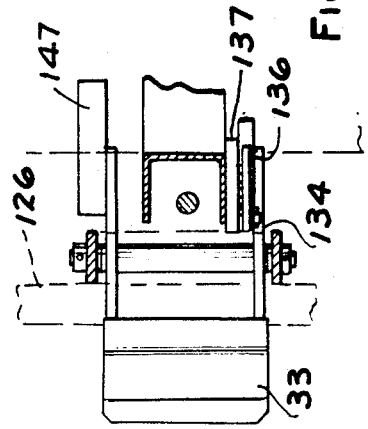
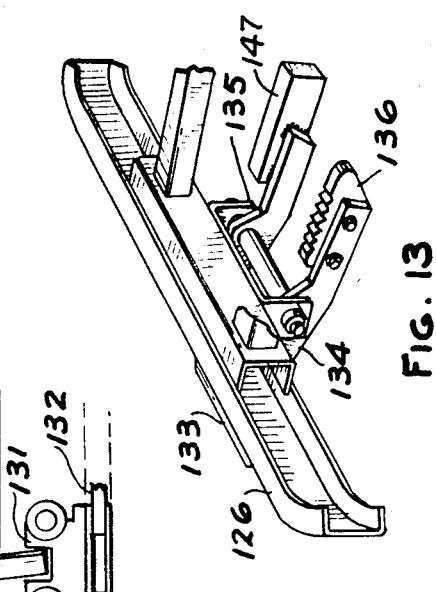
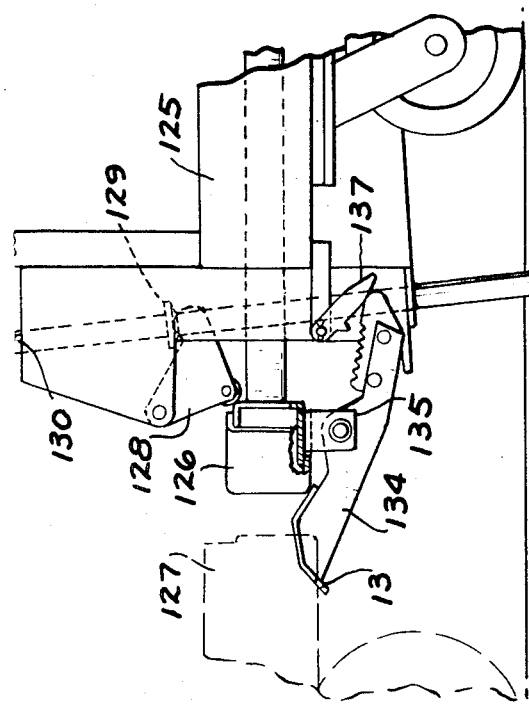
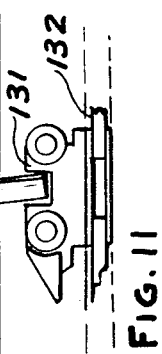

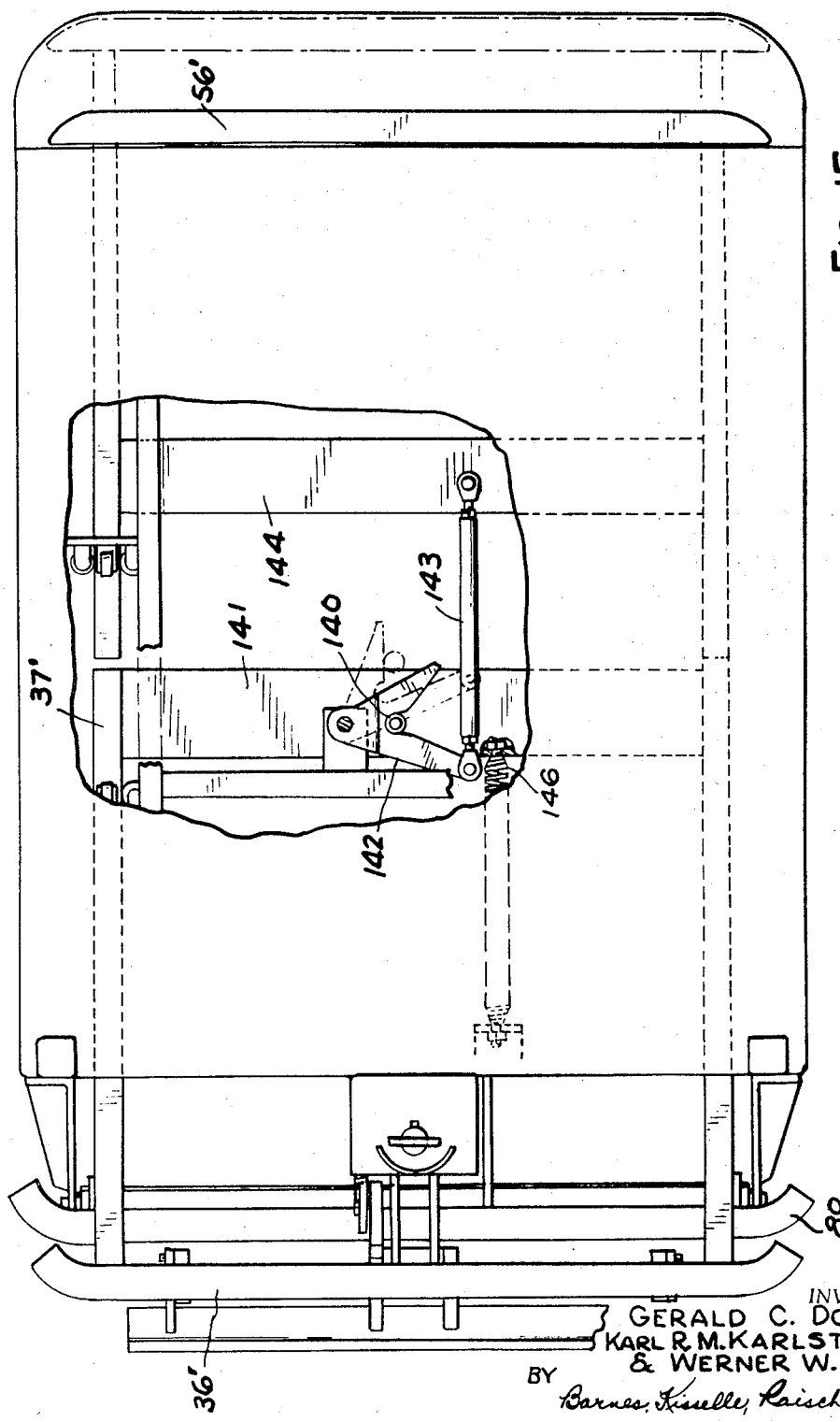

3,467,023
ACCUMULATING AND PUSHER TOW TRUCK CONVEYOR SYSTEM
Gerald C. Dodds, Royal Oak, Karl R. M. Karlstrom, Roseville, and Werner W. Kort, Grosse Pointe Woods, Mich., assignors, by mesne assignments, to American Chain & Cable Company, Inc., New York, N.Y., a corporation of New York
Filed Nov. 10, 1966, Ser. No. 593,412
Int. Cl. B61b 9/00; B61j 3/04
U.S. Cl. 104—172                        44 Claims

ABSTRACT OF THE DISCLOSURE

A tow truck conveyor system comprising a plurality of tow trucks, each of which has a tow pin extending downwardly for engagement of a conveyor through a slot in the floor. Each tow truck comprises a body and a movable front accumulation bumper, a movable rear accumulation bumper and lost motion means between the front accumulation bumper and the rear accumulation bumper. When the front accumulation bumper engages an obstacle, it moves the tow pin out of engagement with the conveyor.

---

This invention relates to tow truck conveyor systems and particularly to accumulating and pusher tow truck conveyor systems.

Tow truck conveyor systems conventionally comprise a plurality of carriers or tow trucks having conveyor engaging means thereon such as a tow pin that extends downwardly through a slot in a floor for engagement with a main conveyor. Spur or transfer slots are provided at longitudinally spaced points along the floor so that when it is desired to move a tow truck off the main line or conveyor, it can be guided by the tow pin through the spur or transfer slot. It is common to provide an accumulation bumper at the front of the carrier which is operatively connected to the tow pin to lift the tow pin in the event that the tow truck encounters an obstacle. Such an accumulating system is shown in the patents to Botley 2,234,620 and Rainier 2,619,916. Where the tow trucks are diverted to a spur or transfer slot, it is often desirable that a succeeding tow truck push the diverted tow truck clear of the main conveyor line or push one or more tow trucks along the transfer slot. It has heretofore been suggested that various systems might be utilized to achieve this purpose such as, for example, the patents to Bradt et al. 3,094,944 and 3,103,895.

In the patent to Bradt et al. 3,094,944, a front bumper is structurally connected to a rear bumper. Theoretically, when the front bumper engages an obstacle, the rear bumper is moved into position for engagement by the front bumper of a succeeding tow truck so that the succeeding tow truck will be interrupted in its movement and have its tow pin elevated by the engagement of the front bumper of the succeeding tow truck with the rear bumper of the preceding tow truck. If the preceding tow truck has not encountered an obstacle and the rear bumper has not been moved rearwardly, a succeeding carrier will engage a fixed bumper on the preceding tow truck to push it along, for example, along a spur or transfer slot. One of the problems with such an arrangement is that the movement of the rear bumper to an accumulating position is dependent upon and in direct relation to the movement of the front bumper. Accordingly, if for some reason the front bumper is moved a different distance on succeeding carriers, as, for example, if the carrier is moving at a different speed or is carrying a different load so that its mass is different, it is possible that the rear bumper of certain of the carriers will not have been moved sufficiently to lift the tow pin of the succeeding carrier or to move the rear bumper of the succeeding carrier into position for engagement with the front bumper of the following carrier. A further disadvantage of such a construction is that the full impact of a succeeding carrier is transmitted from the rear bumper to the front bumper and, in turn, to the obstacle that has interrupted the movement of the carrier.

The structure shown in Bradt et al. 3,103,895 comprises an arrangement wherein, in one embodiment, movement of the front bumper to elevate the tow pin disposes a link in such a position as to produce a rigid connection between the front bumper and a movable rear bumper. In this arrangement, in the event that a tow truck has not encountered an obstacle and a succeeding tow truck is being pushed by a succeeding tow truck and an obstacle is then encountered by the leading tow truck, it is impossible for the front bumper of the truck being pushed to move the lever into position to establish the rigid connection between the front and rear bumpers. In another form, movement of the front bumper results in locking of the rear bumper and the same disadvantage exists if the tow truck is being pushed. In another form shown in Bradt et al. 3,103,895, there is normally a rigid connection between a front bumper and a rear bumper which connection is broken upon accumulation. However, in the event that a tow truck is being pushed and an obstacle is encountered, it is difficult, if not impossible, to break the rigid connection and as a result the tow pin cannot be lifted.

Among the objects of the invention are to provide a tow truck conveyor system wherein both positive accumulation and pushing through are achieved without the problems of the prior art constructions; wherein successive disengagement of the tow trucks after accumulation is insured; wherein the impact of succeeding tow trucks is not transmitted to the preceding tow trucks and, in turn, to the obstacle encountered by the first tow truck; wherein pushing through can be achieved even when the tow truck to be pushed is at an acute angle to the line of pushing; which utilizes a tow truck having a novel brake operating system; and which will carry large loads efficiently and with minimum maintenance and repair.

In the drawings:

FIG. 1 is a part sectional side elevational view of a tow truck conveyor system embodying the invention.

FIG. 2 is a part sectional side elevational view showing the accumulation of two tow trucks.

FIG. 3 is a partly diagrammatic exploded perspective view of the tow truck system embodying the invention.

FIG. 4 is a diagrammatic plan view of a system embodying the invention.

FIG. 5 is a fragmentary part sectional plan view.

FIG. 8 is a fragmentary sectional view taken along the line 8—8 in FIG. 7.

FIG. 9 is a fragmentary sectional view on an enlarged scale taken along the line 9—9 in FIG. 2.

FIG. 10 is a fragmentary sectional view on an enlarged scale taken along the line 10—10 in FIG. 2.

FIG. 11 is a fragmentary side elevational view of a modified form of tow truck.

FIG. 12 is a view similar to FIG. 11 showing the relative positions of a pair of accumulated tow trucks.

FIG. 13 is a fragmentary perspective view of a portion of the tow truck shown in FIGS. 11 and 12.

FIG. 14 is a fragmentary sectional view taken along the line 14—14 in FIG. 12.

FIG. 15 is a part sectional plan view of a further modified form of a tow truck.

Figure 6:
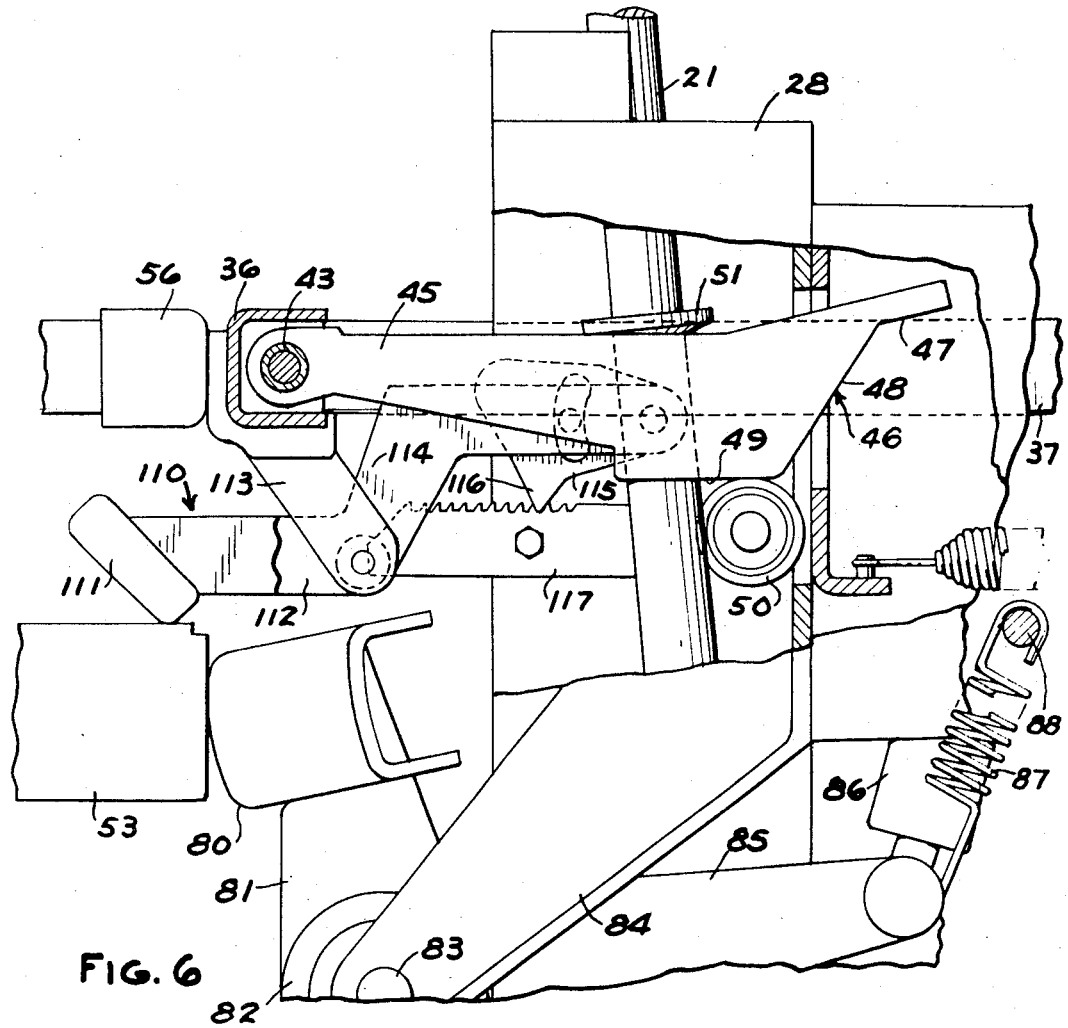
FIG. 6 is a fragmentary part sectional view on an enlarged scale of a portion of the tow truck system shown in FIG. 2.

Referring to FIGS. 1 and 2, the tow truck conveyor system embodying the invention comprises a plurality of wheeled tow trucks 20, each of which has a vertically reciprocable tow pin 21 adjacent the front end thereof that extends downwardly through a slot 22 in the floor and is engaged by a lug 23 on a conveyor chain 24 which is driven beneath the floor to pull the tow truck along the slot 22. At various points along the length of the slot 22, spur or branch slots 22a are provided into which the tow truck may be diverted upon signal in accordance with the requirement of the particular installation of the tow truck conveyor system.

In accordance with the invention, as shown diagrammatically in FIG. 4, it is required that the tow pin 21 be elevated in the event that a tow truck 20a encounters an obstacle O or a preceding carrier. Succeeding tow trucks 20b must have their tow pins 21 elevated as they successively encounter a preceding truck. In addition, it is required that in the event a tow truck 20c has its tow pin 21 in a branch slot and a portion of the tow truck projects into the path of the main slot, the succeeding tow truck 20d will push the preceding tow truck 20c along the branch slot and out of the path of the succeeding truck 20d.

As shown in FIGS. 1 and 2, the tow truck 20 includes a body 26 that is generally rectangular. The tow pin 21 is mounted for vertical sliding movement in an opening 27 of a tow pin mounting bracket 28 fixed on the front end of the body 26. The lower end of the tow pin 21 extends through a slot in a link 29 that is slidably mounted for movement longitudinally of the tow truck on the lower end of the bracket 28 by a bolt 30 that extends through an elongated slot in the link. The link 29 is connected by a pair of tension springs 31 to a bracket 32 fastened to the body of the truck by plates 33. The arrangement is such that the springs 31 provide for some limited yielding movement of the tow pin 21 when the lug 23 on the conveyor chain 24 engages the tow pin 21 to thereby minimize the shock. A shock absorber 34 extends between the link and the bracket 33. The shock absorber is interrelated with the function of the springs to minimize the shock as disclosed and claimed in the patent to Klamp 3,015,284.

A front accumulation bumper assembly 35 is slidably mounted at the front end of the body 26 of the truck 20 and includes a front accumulation bumper 36 which is channel-shaped in cross section and extends transversely of the tow truck substantially across the entire width thereof and longitudinally extending tubes 37 (FIG. 3) that are rectangular in cross section and are welded to the front accumulation bumper 36 and extend rearwardly through slots 38 in the front wall 39 of the body 26. Rollers 41 guide the movement of the tubes 37. A channel member 42 extends between the tubes 37 transversely intermediate their ends to provide a rigid construction. A spring 36a extending between body 26 and member 42 yieldingly urges the front accumulation bumper assembly forwardly.

As shown in FIGS. 5 and 6, a horizontal cross pin 43 is journalled between brackets 44 set within the front accumulation bumper 36 and a tow pin cam 45 comprising a pair of interconnected vertical plates is fixed thereto and extends rearwardly. Each plate of the cam 45 has a cam surface 46 including a first inclined portion 47, a second more severely inclined portion 48 and a third generally horizontal portion 49 which successively engage rollers 50 rotatably mounted about horizontal axes on the bracket 28. The upper surfaces of the plates of the cam 45 are engaged by a collar 51 on the tow pin 21. As the front accumulation bumper 36 encounters an obstacle or a preceding tow truck, as more specifically described hereinafter, the front accumulation bumper 36 is pushed rearwardly causing the cam surfaces 47, 48, 49 to successively engage the rollers 50 and thereby swing the arms 45 in a counterclockwise direction as viewed in FIG. 7 from a position shown in FIG. 7 to the position shown in FIG. 6 and thereby move the collar 51 and in turn the tow pin 21 upwardly raising the tow pin 21 out of engagement with the lug 23 of the main conveyor 24.

As shown in FIG. 1, each tow truck 20 includes a fixed rear bumper 53 that extends across the rear of the tow truck transversely substantially across the entire width and rearwardly beyond the rear end of the main body 26 and at a level vertically below the level of the front accumulation bumper 36.

The tow truck 20 includes a movable rear accumulation bumper assembly 55 which includes a rear bumper 56 extending across the entire width of the body 20 and longitudinally extending tubes 57 which are rectangular in cross section and are welded to the rear bumper 56 and extend forwardly through openings 58 in the rear wall 59 of the body 26. Rollers 60, 61 guide the movement of the tubes 57.

As shown in FIGS. 3 and 10, the forward ends of the tubes 57 are pivoted between the upper ends of pairs of levers 62 which in turn have their lower ends welded to a tube 63. The tube 63 is journalled by bearings 64 on a rod 65 which extends between brackets 66 that extend downwardly from the sides of the body 26.

As shown in FIGS. 1, 3 and 10, a pair of cams 70 are fixed to the tube 63 and extend upwardly and generally rearwardly. Each cam 70 includes angularly related cam surfaces 71, 72. As shown in FIG. 3, cam follower plates 73 are fixed to and extend downwardly from the side tubes 37 of the front accumulation bumper assembly 35. Each cam follower plate 73 has a roller 74 at the rear end thereof which is adapted to engage the cam surfaces 71, 72 of the cam 70, as presently described.

A spring 75 extends between one of the arms 62 and the body 26 to yieldingly urge the rear accumulation bumper assembly 55 rearwardly against resilient stop blocks 55a.

As shown in FIGS. 1, 2 and 6, the tow truck 20 further includes a shock absorbing and cushioning bumper 80 at the front end thereof which is at the same level as the fixed bumper 53 at the rear. Bumper 80 is fixed to brackets 81 which in turn are fixed to a tube 82. A stub shaft 83 is provided in each end of tube 82 and welded to the tube. Each stub shaft 83 is mounted in a bore in a downwardly extending bracket 84 at the front end of the truck body 26 to form bearings for swinging motion of the bumper 80. A lever 85 extends rearwardly from the tube 82 and a shock absorber 86 has one end thereof connected to the lever 85 and the other end thereof connected to the truck body 26. A spring 87 is also connected to the lever 85 at one end and to a transverse bar 88 at the other. The transverse bar 88 is fastened to the truck body 26. The shock absorber 86 has a high resistance in extending when the bumper 80 encounters an obstacle and a low resistance in collapsing.

As further shown in FIG. 1, each tow truck 20 includes a pair of swiveled wheels 90 adjacent the front end thereof and fixed axle wheels 91 at the rear end thereof. The rear wheels are provided with expanding brakes 92 of generally conventional construction that are operated by movement of an arm 93 rearwardly. A rod 94 is pivoted at one end by a yoke 99 to the upper end of each arm 93 and extends through a sleeve 95 on a bracket 96 that is pivoted to a fixed bracket 97 on the truck body. A spring 98 is interposed between the sleeve 95 and yoke 99. A collar 100 is provided between adjusting nuts 101 and the sleeve 95 so that the degree of compression of the spring 98 can be adjusted by threading the nuts 101 to various positions along the length of the rod 94. A cam follower roller 102 on the plate 96 is engaged by a downwardly and rearwardly inclined cam surface 103 on the cam plate 73 when the front accumulation bumper 36 is moved rearwardly. This swings the plate 96 counterclockwise to urge the sleeve 95 and, in turn, the rod 94 through the spring 98 to the right as shown in FIG. 1 to thereby swing the brake arm 93 and engage the respective brake. Adjustment of nuts 101 will vary the time of application of the brakes. Adjustment of nut 94a will vary the pressure of the brakes.

Figure 7:
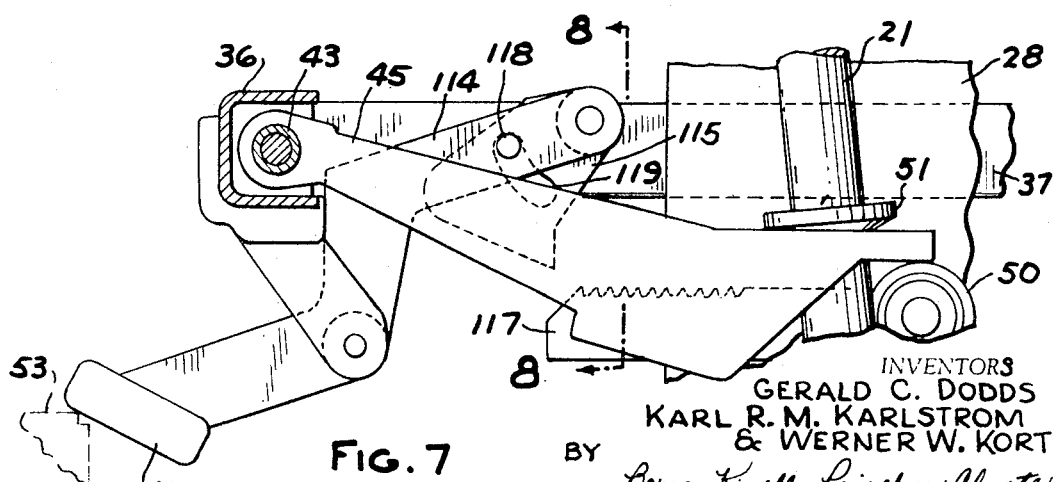
FIG. 7 is a fragmentary part sectional view similar to FIG. 6 showing the parts in a different operative position.

In order to maintain the front accumulation bumper 36 in a position to hold the tow pin 21 out of engagement with the main conveyor until the preceding tow truck has moved away from the front bumper 36, means are provided for insuring that slight movement of the preceding tow truck away from the tow truck will not permit the tow pin to be dropped. As shown in FIGS. 5-8, a positive latch mechanism 110 is provided on the front of the truck and comprises a tubular cross bar 111 that has rearwardly extending levers 112 thereon which are pivoted to downwardly and rearwardly extending brackets 113 on the front accumulation bumper 36. One of the levers 112 intermediate the ends of the bar 111 has a rearwardly extending portion 114 on which a latch dog 115 is pivoted. The latch dog 115 extends forwardly and is biased downwardly by its own weight. The latch dog 115 includes a downwardly extending tooth 116 that is adapted to engage one of a plurality of teeth on a rack bar 117 which is fixed on the bracket 28 and extends forwardly. A pin 118 on the lever portion 114 extends through an arcuate slot 119 in the latch dog 115. By this arrangement, as shown in FIG. 7, when the crossbar 111 is swung counterclockwise, the pin 118 on the lever portion 114 engages the uppermost portion of slot 119 to lift the latch dog 115 out of engagement with the rack 117.

When a tow truck encounters a preceding truck that has been stopped by an obstacle, the front accumulation bumper 36 will engage the rear accumulation bumper 56 of the preceding truck as shown in FIG. 6 and the crossbar 111 will ride onto the top surface of the fixed bumper 53. As the truck moves forwardly, the front accumulation bumper 36 will move rearwardly to lift the tow pin 21 and the weight of the latch dog 115 will cause the dog to engage one of the teeth of the rack bar 117. In this manner, the tow pin 21 will be locked into position out of engagement with the main conveyor. When the preceding truck has moved away, then the weight of the crossbar 111 will bias the crossbar downwardly thereby swinging the latch dog 115 out of engagement with the rack 117 to permit the front accumulation bumper 36 to move forwardly and, in turn, the tow pin 21 to drop down into engagement with the main conveyor.

Operation

If the tow truck shown in FIG. 1 encounters an obstacle, the front accumulation bumper 36 will move rearwardly causing the tow pin cam 45 to swing counterclockwise and lift the tow pin 21 out of engagement with the main conveyor. The movement of the front accumulation bumper 36 rearwardly will also cause cam follower rollers 74 to engage the surface 71 of the cams 70 and thereby hold the rear accumulation bumper 56 in position for engagement by the front accumulation bumper of a succeeding tow truck. If for any reason the rear accumulation bumper 56 has been moved forwardly, the cam follower roller 74 will engage the cam surface 72 to swing the cam 70 and in turn the lever 62 in order to return the rear accumulation bumper 56 to its rearward position.

Since the front accumulation bumper 36 and rear accumulation bumper 56 are not directly mechanically connected, but, on the contrary, by what may be called lost motion means, it is possible for the front accumulation bumper 36 to have further movement without affecting the fixed relationship of the rear bumper 56 that has been established by engagement of the rollers 74 with the cams 70. Thus, after a predetermined movement of the front accumulation bumper 36, the rear accumulation bumper 56 has been caused to be held in fixed position without regard to the further movement that the front accumulation bumper 36 might have as a result of the varying speed of the tow truck or the different mass which would cause the tow truck to have a different momentum.

The rearward movement of the front accumulation bumper 36 also causes the cam plates 73 to engage the brake actuating cam follower rollers 102 to engage the brakes.

As a succeeding tow truck approaches the preceding tow truck that has been stopped, the front accumulation bumper 36 of the succeeding tow truck will engage the rear accumulation bumper 56 of the preceding tow truck as shown in FIG. 2, and the front accumulation bumper 36 will be moved rearwardly as shown in FIG. 6 to lift the tow pin because the rear accumulation bumper 56 of the preceding tow truck has been locked in its rear position by rollers 74 and cams 70. At the same time, crossbar 111 will be swung clockwise onto the top surface of the fixed bumper 53 of the preceding truck permitting the latch dog 115 to engage the rack bar 117 and thereby lock the tow pin in raised position. The movement of the front accumulation bumper 36 rearwardly will in turn hold rear accumulation bumper 56 of the succeeding truck in position for engagement by the front accumulation bumper of a further succeeding carrier and engage the brakes of the tow truck.

When the obstacle to the first tow truck is removed, the tow pin of that tow truck will drop downwardly into the slot 22 and, as the lug of the main conveyor approaches, the lug will pick up the tow pin and move the tow truck along the slot. As the first tow truck is moved away from the next succeeding tow truck, the crossbar 111 of the succeeding tow truck will be permitted to swing counterclockwise as viewed in FIG. 7 to disengage the latch dog 115 from the rack bar 117 permitting the tow pin 21 to drop and the brakes of the succeeding tow truck to be disengaged so that the succeeding tow truck can be picked up by a lug on the main conveyor. Each succeeding tow truck will have its tow pin dropped in succession.

As shown in FIGS. 2 and 6, any continued movement of a tow truck due to its momentum brings the shock absorbing bumper 80 into engagement with the fixed bumper 53 so that the full shock and load of the stoppage of the tow truck is taken up by the shock absorbing bumper and the associated linkage.

The provision of the front and rear accumultion bumpers entirely across the width of the tow truck permits operation of the system even under extreme conditions. For example, as shown in FIG. 4, in the event that a tow truck 20e has been moved onto a main slot and the tow pin manually dropped into the main slot with the tow truck angularly related to the main slot, the succeeding tow truck 20f will engage the fixed bumper 53 of a tow truck 20e and force it along the conveyor in the event that the tow truck has not been picked up by the main conveyor. When truck 20f contacts truck 20e in this manner, as well as when truck 20d contacts 20c to push it into the spur 22a, the rear accumulation bumper of each preceding truck is in its unlocked position, since no obstacle has moved its front accumulation bumper backward. But the spring 36a which urges the front accumulation bumper forward is stronger than the spring 75 which urges the rear accumulation bumper backward (FIG. 3), so that the front accumulation bumpers of trucks 20f and 20d will not be pushed backward by the rear accumulation bumpers of the preceding trucks upon contact, but rather the aforementioned rear accumulation bumpers, being unlocked and having a lighter spring, are moved forward. Consequently, the tow pins of the trucks 20f and 20d will not be lifted, allowing them to propel the corresponding preceding trucks when subsequent contact is made between the shock absorbing bumper of each succeeding truck and the lower, fixed rear bumper of each preceding truck.

It can be seen that the shock absorbing bumper of the tow truck serves a double purpose, i.e., to bring the truck to a gentle stop when contacting an obstacle or another truck which, in turn, has come to a stop behind an obstacle or as the last of a group of stationary, accumulated trucks, and also, to absorb the shock when starting a stationary truck which is free to move, by means of an approaching truck which is to push it ahead.

In the form of the invention shown in FIGS. 11–14, the latch mechanism for locking the front accumulation bumper in position until the preceding tow truck has moved away is modified such that the rack is mounted on the operating or movable actuating bar and the latch dog is mounted on the tow truck. Specifically, the tow truck 125 includes a front accumulation bumper 126 that is mounted for movement longitudinally of the tow truck so that when it engages the rear 127 of a preceding tow truck, it causes a pivoted plate 128 to swing counterclockwise and force collar 129 and, in turn, tow pin 130 upwardly out of engagement with lug 131 of a conveyor 132.

A crossbar 133 has rearwardly extending levers 134 which are pivoted to brackets 135 on the front accumulation bumper 126. A rack bar 136 is fixed on one of the levers 134 and is adapted to be engaged by a latch dog 137 that is pivoted on the track 125. When the front accumulation bumper 126 engages the rear 127 of a preceding carrier to lift the tow pin, the crossbar 133 is forced beneath the tow truck swinging the rack 136 into the position shown in FIG. 12 and causing the latch dog 137 to engage one of the teeth of the rack bar 136. When the preceding tow truck is moved away from the tow truck, the crossbar 133 is permitted to swing clockwise through the gravity force of counterweight 147 (FIG. 13), moving the rack bar 136 out of engagement with the latch dog 137 and thereby permitting the front bumper 126 to move forwardly under the action of springs (not shown) to lower the tow pin into engagement with the main conveyor.

In the form of the invention shown in FIGS. 11–14, there is no push through construction as shown so that there is no rear accumulation bumper as defined in the previous form of the invention. Therefore this type of truck is not suitable to push another one because its tow pin will always be lifted when the truck contacts a stationary truck.

In the form of the invention shown in FIG. 15, the operating linkage between the front accumulation bumper and the rear accumulation bumper is modified. Specifically, the cam follower roller 140 is provided on a transverse bar 141 which extends between the tubes 37' of the front accumulation bumper 36'. The cam follower roller 140 is adapted to engage a cam 142 that is pivoted about a vertical axis on the truck body and is connected by a link 143 with a cross member 144 that extends between the tubes of the rear accumulation bumper assembly. When the front accumulation bumper 36' is moved rearwardly or to the right as viewed in FIG. 15, the cam follower roller 140 forces the cam 142 counterclockwise to the broken line position and swings the rear accumulation bumper 56' to the right to the broken line position shown in FIG. 15. The cam 142 is so proportioned that during the first portion of the front acumulation bumper motion to the right, the rear bumper 56' completes its full motion and remains stationary during additional travel of the front accumulation bumper. A spring 146 normally urges the rear accumulation bumper to the right so that conventionally the movement of the front accumulation bumper rearwardly or to the right merely moves the cam follower roller into position to hold the rear accumulation bumper in its rearmost position for engaging the front accumulation bumper of a succeeding tow truck.

We claim:
1. In a carrier, the combination comprising
a body,
means for supporting said body for movement along a path,
a front accumulation bumper,
means for movably mounting said accumulation bumper at the front end of said body,
means on said body operable by said front accumulation bumper when said front accumulation bumper is engaged by an obstacle and moved a predetermined minimum distance relative to said body to disengage an operating connection with a conveyor,
a rear accumulation bumper,
means for movably mounting said rear accumulation bumper at the rear end of said body for movement from a predetermined position where said rear accumulation bumper is engageable by a front accumulation bumper of a succeeding carrier and if held in said predetermined position will move the front accumulation bumper of a succeeding carrier to disengage said operating connection to a position where said rear accumulation bumper will not move the front accumulation bumper of a succeeding carrier,
lost motion means between said front accumulation bumper and said rear accumulation bumper operable in such a manner that when said front accumulation bumper engages an obstacle, said front accumulation bumper is moved and, in turn, moves said lost motion means to hold said rear accumulation bumper in said preteremined position relative to said body where it is engageable by a front accumulation bumper of a succeeding carrier to move said front accumulation bumper of the succeeding carrier and, in turn, disengage the operating connection of a succeeding carrier,
said lost motion means being such that the front accumulation bumper may move further due to engagement with said obstacle after it has moved to a position to cause said rear accumulation bumper to be held in said predetermined position for engagement by the front accumulation bumper of a succeeding carrier,
and means on the rear of said body engageable by a succeeding carrier when said rear accumulation bumper is not held in predetermined position for engagement with the front accumulation bumper of a succeeding carrier to cause said carrier to be pushed by the succeeding carrier.

2. The combination set forth in claim 1 wherein said lost motion means comprises a cam movable with said rear accumulation bumper and a cam follower movable with said front accumulation bumper for engaging the cam,
said cam having a surface whereby in the initial movement of said cam follower along said cam, said cam is moved to a position corresponding to the predetermined position where said rear accumulation bumper is held for engagement by the front accumulation bumper of the succeeding carrier and further movement of the cam follower along said cam does not further move the cam and, in turn, the rear accumulation bumper.

3. The combination set forth in claim 1 including a brake for stopping said carrier,
means responsive to the movement of said front accumulation bumper to actuate said brake comprising a cam movable with said front accumulation bumper, and a cam follower associated with said brake and engaged by said cam for operating said brake when the front accumulation bumper engages an obstacle.

4. The combination set forth in claim 1 including means yieldingly urging said front accumulation bumper in a direction opposite to the direction of movement of said front accumulation bumper when it engages an obstacle and means yieldingly urging said rear accumulation bumper in a direction toward the predetermined position wherein said rear accumulation bumper is engaged by the front accumulation bumper of a succeeding carrier.

5. The combination set forth in claim 1 including a shock absorbing bumper, means for yieldingly mounting said shock absorbing bumper at the front of said body, said body having a fixed rear bumper adapted to be engaged by a shock absorbing bumper of a succeeding carrier either after the front accumulation bumper of the succeeding carrier has engaged the rear accumulation bumper of the preceding carrier or when said rear accumulation bumper has not been so engaged.

6. The combination set forth in claim 1 including interengaging means between said front accumulation bumper and the rear of a preceding carrier for holding said front accumulation bumper in position after the accumulating bumper has been moved to disengage the operating connection with a conveyor and the rear accumulation bumper has been moved to said predetermined position for contact by the front accumulation bumper of a succeeding carrier, said interengaging means being operable until the preceding carrier has moved away from the succeeding carrier.

7. The combination set forth in claim 6 wherein said last mentioned means comprises latch means operable by engagement of said front accumulation bumper with the rear of a preceding carrier and held in latched relation by contact with the preceding carrier to hold the front accumulation bumper in position disengaging the operative connection and to hold the rear accumulation bumper in position to be engaged by the front accumulation bumper of a succeeding carrier.

8. The combination set forth in claim 7 wherein said latch means comprises a latch operating lever pivoted on said front accumulation bumper, a rack mounted on one of said latch lever and said body, and a latch dog pivoted on the other of said latch lever and said body and adapted to engage said rack, the rear of said carrier having a surface adapted to engage the latch lever of a succeeding carrier to hold said latch lever out of operative engagement with said latch dog until such time as the carrier is moved away from the succeeding carrier whereupon the latch lever engages the latch dog and moves it out of engagement with the rack.

9. The combination set forth in claim 8 wherein said aforementioned surface on the rear of the carrier comprises a substantially horizontal surface.

10. The combination set forth in claim 8 wherein said latch lever is pivoted intermediate its ends to said front accumulation bumper, the forward end of said latch lever being biased vertically into engagement with the surface at the rear of a preceding carrier, said latch dog being pivoted to the rear end of said latch lever, means on said latch lever adapted to lift said latch dog out of engagement with said rack when said surface on a preceding carrier moves away from the leading end of said latch lever.

11. The combination set forth in claim 10 wherein said last mentioned means comprises a slot in said latch dog and a pin on said latch lever engaging said slot.

12. The combination set forth in claim 8 wherein said latch lever has a bumper on the front end thereof extending substantially across the entire width of said carrier.

13. The combination set forth in claim 7 wherein said latch means comprises a latch operating lever pivoted on said front accumulation bumper, a rack mounted on one end of said latch lever, a latch dog pivoted on said body and adapted to engage said rack in one position of said rack, the rear of said carrier having a surface adapted to engage a latch lever of a succeeding carrier to hold said rack in engagement with said latch dog until such time as the carrier is moved away from the succeeding carrier whereupon the rack is moved away from the latch dog permitting the latch dog to become disengaged.

14. The combination set forth in claim 1 wherein said front accumulation bumper and said rear accumulation bumper extend substantially across the entire width of said carrier.

15. The combination set forth in claim 1 wherein said means for mounting said front accumulation bumper on said body comprises means guiding said front accumulation bumper in a substantially straight line parallel to the axis of said carrier.

16. The combination set forth in claim 1 wherein said means for mounting said rear accumulation bumper on said body comprises a pair of longitudinally extending members fixed to said rear accumulation bumper, means on said body for guiding the trailing ends of said members for substantially parallel movement with respect to the longitudinal axis of said carrier, at least one lever pivoted to the forward end of each said longitudinally extending members at its upper end, a torque member extending transversely of said carrier, the lower ends of said levers being fixed to said torque member.

17. The combination set forth in claim 14 wherein said lost motion means comprises a cam fixed to said torque tube and extending generally upwardly therefrom, said front accumulation bumper having a cam follower movable therewith and engaging said cam.

18. The combination set forth in claim 1 wherein said lost motion means comprises a cam movably mounted on said body, a cam follower movable with said front accumulation bumper, means operatively connecting said cam with said rear accumulation bumper, said cam having a surface whereby upon initial movement of said cam follower along said cam, said cam and, in turn, said rear accumulation bumper are moved to a position corresponding to the predetermined position where said rear accumulation bumper is held for engagement by a front accumulation bumper of a succeeding carrier and further movement of the cam follower along said cam does not further move the cam and, in turn, the rear accumulation bumper.

19. In a tow truck, the combination comprising a body, wheels on said body for supporting said body for movement along a path, a front accumulation bumper, means for mounting said accumulation bumper at the front end of said body for movement longitudinally of said body, a tow pin mounted on said body for substantially vertical movement and operable by said front accumulation bumper when said front accumulation bumper is engaged by an obstacle and moved a predetermined minimum distance relative to said body to lift said tow pin and disengage the tow pin from a conveyor, a rear accumulation bumper, means mounting said rear accumulation bumper at the rear end of said body for movement longitudinally of said body from a predetermined position where said rear accumulation bumper is engageable by a front bumper of a succeeding tow truck and if held in said predetermined position will move the front accumulation bumper of a succeeding carrier to disengage said operating connection to a position where said rear accumulation bumper will not move the front accumulation bumper of a succeeding tow truck, lost motion means between said front accumulation bumper and said rear accumulation bumper operable in such a manner that when said front accumulation bumper engages an obstacle, said front accumulation bumper is moved and, in turn, moves said lost motion means to hold said rear accumulation bumper in said predetermined position relative to said body where it is engageable by a front accumulation bumper of a succeeding tow truck to move said front accumulation bumper of the succeeding tow truck and, in turn, disengage the operating connection of a succeeding tow truck, said lost motion means being such that the front accumulation bumper may move further due to engagement with said obstacle after it has moved to a position to cause said rear accumulation bumper to be held in said predetermined position for engagement by the front accumulation bumper of a succeeding tow truck, and means on the rear of said body engageable by a succeeding tow truck when said rear accumulation bumper is not held in predetermined position for engagement with the front accumulation bumper of a succeeding tow truck to cause said carrier to be pushed by the succeeding truck.

20. The combination set forth in claim 19 wherein said lost motion means comprises a cam movable with said rear accumulation bumper and a cam follower movable with said front accumulation bumper for engaging the cam, said cam having a surface whereby in the initial movement of said cam follower along said cam, said cam is moved to a position corresponding to the predetermined position where said rear accumulation bumper is held for engagement by the front accumulation bumper of the succeeding tow truck and further movement of the cam follower along said cam does not further move the cam and, in turn, the rear accumulation bumper.

21. The combination set forth in claim 19 including a wheel brake for stopping said tow truck, means responsive to the movement of said front accumulation bumper to actuate said brake comprising a cam movable with said front accumulation bumper, and a cam follower associated with said brake and engaged by said cam for operating said brake when the front accumulation bumper engages an obstacle.

22. The combination set forth in claim 19 including means yieldingly urging said front accumulation bumper in a forward direction opposite to the direction of movement of said front accumulation bumper when it engages an obstacle and means yieldingly urging said rear accumulation bumper in a rearward direction toward the predetermined position wherein said rear accumulation bumper in a rearward direction toward the predetermined position wherein said rear accumulation bumper is engaged by the front accumulation bumper of a succeeding tow truck.

23. The combination set forth in claim 19 including a shock absorbing bumper, means for yieldingly mounting said shock absorbing bumper at the front of said body for movement longitudinally of the tow truck, said body having a fixed rear bumper adpated to be engaged by a shock absorbing bumper of a succeeding tow truck either after the front accumulation bumper of the succeeding tow truck has engaged the rear accumulation bumper of the preceding tow truck or when said rear accumulation bumper has not been so engaged.

24. The combination set forth in claim 19 including interengaging means between said front accumulation bumper and the rear of a preceding tow truck for holding said front accumulation bumper in position after the accumulating bumper has been moved to lift the tow pin out of engagement with a conveyor and the rear accumulation bumper has been moved to said predetermined position for contact by the front accumulation bumper of a succeeding tow truck, said interengaging means being operable until the preceding tow truck has moved away from the succeeding tow truck.

25. The combination set forth in claim 24 wherein said last mentioned means comprises latch means operable by engagement of said front accumulation bumper with the rear of a preceding tow truck and held in latched relation by contact with the preceding tow truck to hold the front accumulation bumper in position with the tow pin out of engagement with a conveyor and to hold the rear accumulation bumper in position to be engaged by the front accumulation bumper of a succeeding tow truck.

26. The combination set forth in claim 25 wherein said latch means comprises a latch operating lever pivoted on said front accumulation bumper, a rack mounted on one of said latch lever and said body, and a latch dog pivoted on the other of said latch lever and said body and adapted to engage said rack, the rear of said tow truck having a surface adapted to engage the latch lever of a succeeding tow truck to hold said latch lever out of operative engagement with said latch dog until such time as the carrier is moved away from the succeeding tow truck whereupon the latch lever engages the latch dog and moves it out of engagement with the rack.

27. The combination set forth in claim 26 wherein said aforementioned surface on the rear of the tow truck comprises a substantially horizontal surface.

28. The combination set forth in claim 26 wherein said latch lever is pivoted intermediate its ends to said front accumulation bumper, the forward end of said latch lever being biased vertically into engagement with the surface at the rear of a preceding tow truck, said latch dog being pivoted to the rear end of said latch lever, means on said latch lever adapted to lift said latch dog out of engagement with said rack when said surface on a preceding tow truck moves away from the leading end of said latch lever.

29. The combination set forth in claim 28 wherein said last mentioned means comprises a slot in said latch dog and a pin on said latch lever engaging said slot.

30. The combination set forth in claim 26 wherein said latch lever has a bumper on the front end thereof extending substantially across the entire width of said tow truck.

31. The combination set forth in claim 26 wherein said latch means comprises a latch operating lever pivoted on said front accumulation bumper, a rack mounted on one end of said latch lever, a latch dog pivoted on said body and adapted to engage said rack in one position of said rack, the rear of said tow truck having a surface adapted to engage a latch lever of a succeeding tow truck to hold said rack in engagement with said latch dog until such time as the tow truck is moved away from the succeeding tow truck whereupon the rack is moved away from the latch dog permitting the latch dog to become disengaged.

32. The combination set forth in claim 19 wherein said front accumulation bumper and said rear accumulation bumper extend substantially across the entire width of said tow truck.

33. The combination set forth in claim 19 wherein said means for mounting said front accumulation bumper on said body comprises means guiding said front accumulation bumper in a substantially straight line parallel to the axis of said tow truck.

34. The combination set forth in claim 19 wherein said means for mounting said rear accumulation bumper on said body comprises a pair of longitudinally extending members fixed to said rear accumulation bumper, means on said body for guiding the trailing ends of said members for substantially parallel movement with respect to the longitudinal axis of said tow truck, at least one lever pivoted to the forward end of each said longitudinally extending members at its upper end, a torque member extending transversely of said tow truck, the lower ends of said levers being fixed to said torque member.

35. The combination as set forth in claim 34 wherein said lost motion means comprises a cam fixed to said torque member and extending generally upwardly therefrom, said front accumulation bumper having a cam follower movable therewith and engaging said cam.

36. The combination set forth in claim 19 wherein said lost motion means comprises a cam movably mounted on said body, a cam follower movable with said front accumulation bumper, means operatively connecting said cam with said rear accumulation bumper, said cam having a surface whereby upon initial movement of said cam follower along said cam, said cam and, in turn, said rear accumulation bumper are moved to a position corresponding to the predetermined position where said rear accumulation bumper is held for engagement by a front accumulation bumper of a succeeding tow truck and further movement of the cam follower along said cam does not further move the cam and, in turn, the rear accumulation bumper.

37. In a carrier, the combination comprising
a body,
means for supporting said body for movement along a path,
a front accumulation bumper,
means for movably mounting said accumulation bumper at the front end of said body,
means on said body operable by said front accumulation bumper when said front accumulation bumper is engaged by an obstacle and moved a predetermined minimum distance relative to said body to disengage an operating connection with a conveyor,
interengaging means between said front accumulation bumper and the rear of a preceding carrier for holding said front accumulation bumper in position after the accumulating bumper has been moved to disengage the operating connection with a conveyor, said interengaging means being operable until the preceding carrier has moved away from the succeeding carrier,
said last mentioned means comprises latch means operable by engagement of said front accumulation bumper with the rear of a preceding carrier and held in latched relation by contact with the preceding carrier to hold the front accumulation bumper in position disengaging the operative connection.

38. The combination set forth in claim 37 wherein said latch means comprises
a latch operating lever pivoted on said front accumulation bumper,
a rack mounted on one of said latch lever and said body,
and a latch dog pivoted on the other of said latch lever and said body and adapted to engage said rack,
the rear of said carrier having a surface adapted to engage the latch lever of a succeeding carrier to hold said latch lever out of operative engagement with said latch dog until such time as the carrier is moved away from the succeeding carrier whereupon the latch lever engages the latch dog and moves it out of engagement with the rack.

39. The combination set forth in claim 38 wherein said aforementioned surface on the rear of the carrier comprises a substantially horizontal surface.

40. The combination set forth in claim 38 wherein said latch lever is pivoted intermediate its ends to said front accumulation bumper,
the forward end of said latch lever being biased vertically into engagement with the surface at the rear of a preceding carrier,
said latch dog being pivoted to the rear end of said latch lever,
means on said latch lever adapted to lift said latch dog out of engagement with said rack when said surface on a preceding carrier moves away from the leading end of said latch lever.

41. The combination set forth in claim 40 wherein said last mentioned means comprises a slot in said latch dog and a pin on said latch lever engaging said slot.

42. The combination set forth in claim 37 wherein said latch means comprises a latch operating lever pivoted on said front accumulation bumper,
a rack mounted on one end of said latch lever,
a latch dog pivoted on said body and adapted to engage said rack in one position of said rack,
the rear of said carrier having a surface adapted to engage a latch lever of a succeeding carrier to hold said rack in engagement with said latch dog until such time as the carrier is moved away from the succeeding carrier whereupon the rack is moved away from the latch dog permitting the latch dog to become disengaged.

43. The combination set forth in claim 37 wherein said front accumulation bumper extends substantially across the entire width of said carrier,
said latch lever having a bumper on the front end thereof extending substantially across the entire width of said carrier.

44. In a carrier, the combination comprising
a body,
means for supporting said body for movement along a path,
a front accumulation bumper,
means for movably mounting said accumulation bumper at the front end of said body,
means on said body operable by said front accumulation bumper when said front accumulation bumper is engaged by an obstacle and moved a predetermined minimum distance relative to said body to disengage an operating connection with a conveyor,
a brake for stopping said carrier,
means responsive to the movement of said front accumulation bumper to actuate said brake comprising
a cam movable with said front accumulation bumper,
and a cam follower,
adjustable means interconnecting said cam follower and said brake and engaged by said cam for operating said brake when the front accumulation bumper engages an obstacle.

References Cited

UNITED STATES PATENTS

| 3,094,944 | 6/1963 | Bradt | 104—172 |
| 3,103,895 | 9/1963 | Bradt | 104—172 |

FOREIGN PATENTS

| 896,530 | 9/1960 | Great Britain. |

ARTHUR L. LA POINT, Primary Examiner
DANIEL F. WORTH, III, Assistant Examiner

U.S. Cl. X.R.

104—178